United States Patent
Tang et al.

(10) Patent No.: US 12,152,319 B2
(45) Date of Patent: Nov. 26, 2024

(54) HIGH-STRENGTH CREEP-RESISTANT POLYESTER INDUSTRIAL YARN AND PREPARATION METHOD THEREOF

(71) Applicant: JIANGSU HENGLI CHEMICAL FIBRE CO., LTD., Suzhou (CN)

(72) Inventors: Fangming Tang, Suzhou (CN); Shanshui Wang, Suzhou (CN); Lili Wang, Suzhou (CN); Ye Zhang, Suzhou (CN); Cunhong Wei, Suzhou (CN); Yumei Zhang, Suzhou (CN); Yanli Zhao, Suzhou (CN)

(73) Assignee: JIANGSU HENGLI CHEMICAL FIBRE CO., LTD., Suzhou (CN)

( * ) Notice: Subject to any disclaimer, the term of this patent is extended or adjusted under 35 U.S.C. 154(b) by 0 days.

(21) Appl. No.: 18/269,967

(22) PCT Filed: Aug. 24, 2021

(86) PCT No.: PCT/CN2021/114226
§ 371 (c)(1),
(2) Date: Jun. 28, 2023

(87) PCT Pub. No.: WO2022/142399
PCT Pub. Date: Jul. 7, 2022

(65) Prior Publication Data
US 2023/0392300 A1 Dec. 7, 2023

(30) Foreign Application Priority Data
Dec. 29, 2020 (CN) .......................... 202011607885.3

(51) Int. Cl.
*D02G 3/02* (2006.01)
*D01D 5/16* (2006.01)
*D01F 6/84* (2006.01)

(52) U.S. Cl.
CPC .................. *D02G 3/02* (2013.01); *D01D 5/16* (2013.01); *D01F 6/84* (2013.01); *D10B 2331/04* (2013.01); *D10B 2401/062* (2013.01); *D10B 2401/063* (2013.01)

(58) Field of Classification Search
CPC ... D02G 3/02; D01D 5/16; D01F 6/84; D10B 2331/04; D10B 2401/062; D10B 2401/063; C08G 63/68; C08G 63/22; D01B 2401/062; D01B 2401/063
USPC ................. 428/364; 528/274, 275, 292, 289
See application file for complete search history.

(56) References Cited

U.S. PATENT DOCUMENTS 4,079,045 A * 3/1978 Lazarus ............. C08G 63/6856
528/289

FOREIGN PATENT DOCUMENTS

| CN | 103526325 A | | 1/2014 | | |
|---|---|---|---|---|---|
| CN | 103556291 A | | 2/2014 | | |
| CN | 103556292 A | | 2/2014 | | |
| CN | 108035007 A | | 5/2018 | | |
| CN | 108130609 A | * | 6/2018 | ........... | C08G 63/183 |
| CN | 109280159 A | | 1/2019 | | |
| CN | 109648976 A | * | 4/2019 | ........... | B29C 55/146 |
| CN | 109763194 A | | 5/2019 | | |
| CN | 111635516 A | * | 9/2020 | ........... | C08G 63/672 |
| CN | 112746349 A | | 5/2021 | | |

* cited by examiner

*Primary Examiner* — Camie S Thompson
(74) *Attorney, Agent, or Firm* — Bayramoglu Law Offices LLC

(57) ABSTRACT

A high-strength creep-resistant polyester industrial yarn and preparation method thereof are provided. The high-strength creep-resistant polyester industrial yarn is prepared by spinning, winding and coordination treatment of a modified polyester after solid-state polycondensation to increase viscosity. The condition of coordination treatment is 60-72 hours at 80-100° C. The coordination agent is $AgNO_3$, $FeCl_2$, $CuCl_2$, or $NiCl_2$. The polyester segments of the prepared high-strength creep-resistant polyester industrial yarn includes a terephthalic acid segment, an ethylene glycol segment and a 2-(4-pyridine) terephthalic acid segment, and 2-(4-pyridine) terephthalic acid segments of different polyester segments are coordinated by metal ions ($Ag^+$, $Fe^{2+}$, $Cu^{2+}$ or $Ni^2$). The molar ratio of the terephthalic acid segment to the 2-(4-pyridine) terephthalic acid segment is 1:(0.03-0.05). The N atom on the pyridine of the 2-(4-pyridine) terephthalic acid segment is involved in coordination. Metal ions are coordinated with 2-(4-pyridine) terephthalic acid to greatly reduce the creep degree of the polyester fiber.

8 Claims, No Drawings

HIGH-STRENGTH CREEP-RESISTANT POLYESTER INDUSTRIAL YARN AND PREPARATION METHOD THEREOF

CROSS REFERENCE TO THE RELATED APPLICATIONS

This application is the national phase entry of International Application No. PCT/CN2021/114226, filed on Aug. 24, 2021, which is based upon and claims priority to Chinese Patent Application No. 202011607885.3, filed on Dec. 29, 2020, the entire contents of which are incorporated herein by reference.

TECHNICAL FIELD

The present invention belongs to the field of spinning technology, and more particularly, relates to a high-strength creep-resistant polyester industrial yarn and preparation method thereof.

BACKGROUND

Polyester industrial yarn has excellent physical-mechanical properties such as high strength, high modulus, low elongation, impact resistance, fatigue resistance, good heat resistance, and the strength and elongation value in the wet state is basically the same as that in the dry state. As one of the four major contemporary rubber skeleton materials (viscose, nylon, polyester, and steel wire), it has broad application prospects in vehicle tires, conveyor belts, transportation belts, seat belts, and water hoses, etc.

Under the action of a certain temperature and constant stress, the phenomenon that the deformation of the high polymer gradually increases with time is referred to as creep. Creep is one of the main problems existing in organic fibers, and creep damage is also an urgent problem to be solved in the application of fibers. Creep Mechanism: from the perspective of molecular motion and change, creep includes three parts, ie, normal elastic deformation, high elastic deformation and viscous flow deformation. Three types of deformation often occur simultaneously when the material is stressed, and their size and proportion in the entire creep are affected by the type of the high polymer, the temperature, the magnitude of the external force and the duration of the external force. The polyester molecular chain structure is a symmetrical benzene ring structure linear macromolecule without branching, and the rigidity of the molecular chain is very strong, which is relatively difficult to slide and relatively good in creep resistance, but the creep resistance still needs to be further improved in practical engineering applications.

Creep phenomenon is directly related to the dimensional stability of the material. As one of the cord materials, the polyester industrial yarn has a close relationship between its creep phenomenon and its performance, and if the creep degree is large, it will cause elongation and deformation of the tire frame, resulting in traffic accidents.

SUMMARY

In order to solve the said problems in the prior art, the invention provides a high-strength creep-resistant polyester industrial yarn and preparation method thereof.

To this end, the technical schemes of the invention are as follows:

A high-strength creep-resistant polyester industrial yarn, including: polyester segments of the high-strength creep-resistant polyester industrial yarn includes a terephthalic acid segment, an ethylene glycol segment and a 2-(4-pyridine) terephthalic acid segment, and 2-(4-pyridine) terephthalic acid segments of different polyester segments are coordinated by metal ions;

wherein the molar ratio of the terephthalic acid segment to the 2-(4-pyridine) terephthalic acid segment is 1:(0.03-0.05);

wherein the N atom on the pyridine of the 2-(4-pyridine) terephthalic acid segment is involved in the coordination;

wherein the metal ion is $Ag^+$, $Fe^{2+}$, $Cu^{2+}$ or $Ni^{2+}$, preferably $Fe^{2+}$, $Cu^{2+}$ or $Ni^{2+}$.

For ligands, most of the commonly used ligands are carboxylic acid ligands: the carboxyl groups in carboxylic acid ligands can have strong coordination and chelation capabilities with metal ions, and can be coordinated with metal ions in various ways. The advantages of nitrogen-containing carboxylic acid ligands are: (1) the N and O atoms on the ligand can be used as coordination sites at the same time; (2) when the ligand contains multiple carboxyl groups, the coordination mode can be increased by removing protons, so that different topological types of complexes can be formed.

The 2-(4-pyridine) terephthalic acid belongs to nitrogen heterocyclic aromatic carboxylic acid ligands, which integrates the advantages of aromatic carboxylic acid ligands and nitrogen-containing heterocyclic ligands, has π conjugation effect, and has a plurality of coordination modes, which is easy to self-assemble with metal ions to form multi-dimensional complexes.

In the metal ion-doped polyester, there are not only two pyridine ligands around one core of the metal ion, but also the coordination structure of the pyridine ligands between the two molecules tends to promote the aggregation of polymer chains, while the presence of multiple pyridine ligands tends to reduce the stress relaxation of the polymer chains under stress, showing a reduction in creep.

The coordination structures formed by the coordination of $Ag^+$, $Fe^{2+}$, $Cu^{2+}$ or $Ni^{2+}$ with the 2-(4-pyridine) terephthalic acid segment are respectively:

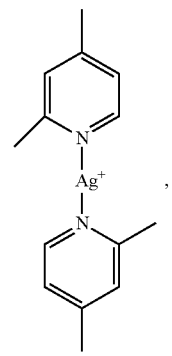

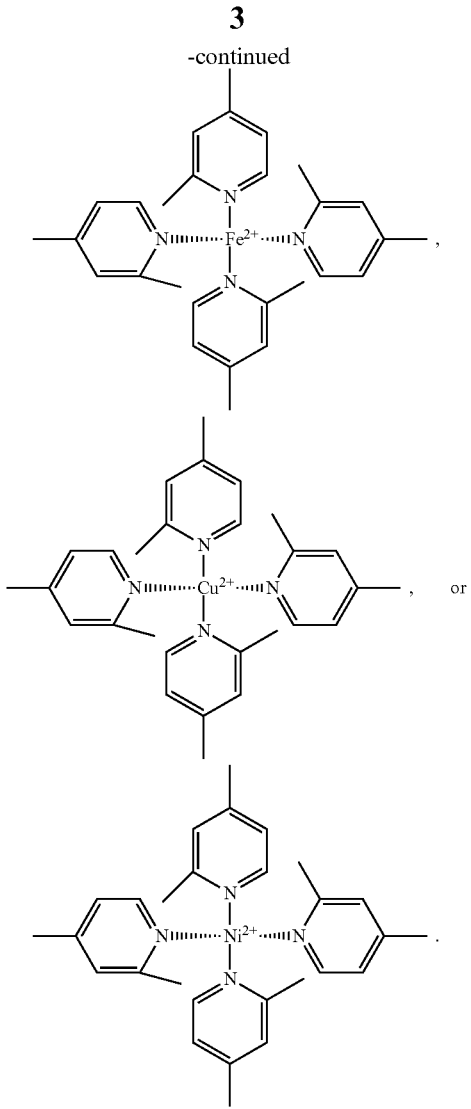

The following preferred technology program is presented to give a detailed description for this invention:

The said high-strength creep-resistant polyester industrial yarn, wherein a creep test is carried out at a temperature of 25° C., a relative humidity of 65%, a constant tension of 2.00 cN/dtex and a time of 10 min, the measured elongation of the high-strength creep-resistant polyester industrial yarn is 1.5-1.7%, and the elongation of ordinary polyester industrial yarn under this condition is 4.5-4.8%;

wherein the performance indexes of the high-strength creep-resistant polyester industrial yarn are as follows: a breaking strength≥7.5 cN/dtex, a breaking strength CV value 52.0/9, a breaking elongation of 20.0±1.5%, and a breaking elongation CV value≤5.5%.

The present invention also provides a method of preparing the high-strength creep-resistant polyester industrial yarn, wherein the high-strength creep-resistant polyester industrial yarn is prepared by spinning, winding and coordination treatment of a modified polyester after solid-state polycondensation to increase viscosity;

wherein the preparation method of the modified polyester includes: after uniformly mixing terephthalic acid, ethylene glycol and 2-(4-pyridine) terephthalic acid, successively performing an esterification reaction and a polycondensation reaction to obtain the modified polyester;

wherein the method of coordination treatment includes: soaking the wound fiber in an aqueous solution of a coordination agent, and the concentration of the aqueous solution of the coordination agent is 0.1-0.2 mol/L;

wherein the condition of coordination treatment is 60-72 hours at 80-100° C.;

wherein the coordination agent is $AgNO_3$, $FeCl_2$, $CuCl_2$, or $NiCl_2$.

The following preferred technology program is presented to give a detailed description for this invention:

In the method of preparing the high-strength creep-resistant polyester industrial yarn, wherein the modified polyester is prepared in the following steps:

(1) Esterification concocting terephthalic acid, ethylene glycol, and 2-(4-pyridine) terephthalic acid into a slurry, adding a catalyst and a stabilizer and mixing uniformly, then carrying out the esterification under a nitrogen pressure ranged from atmospheric pressure to 0.3 MPa, the temperature of the esterification is 250-260° C., finally ending the esterification when a water distillation amount reaches more than 90% of a theoretical value;

(2) Polycondensation after the esterification, starting a low vacuum stage of the polycondensation under a negative pressure, smoothly reducing the nitrogen pressure to below the absolute pressure of 500 Pa within 30-50 min, the temperature of the polycondensation is 250-260° C. and the time is 30-50 min, and then continue vacuuming to conduct a high vacuum stage of the polycondensation, further reducing the nitrogen pressure to below the absolute pressure of 10 Pa, the temperature of the polycondensation is 270-282° C. and the time is 50-90 min, and the modified polyester is obtained;

wherein the molar ratio of terephthalic acid, ethylene glycol and 2-(4-pyridine) terephthalic acid is 1:(1.2-2.0):(0.03-0.05), and the addition amount of the catalyst and the stabilizer is respectively 0.01-0.05 wt % and 0.01-0.05 wt % of the addition amount of the terephthalic acid;

wherein the catalyst is antimony trioxide, ethylene glycol antimony or antimony acetate, and the stabilizer is triphenyl phosphate, trimethyl phosphate or trimethyl phosphite;

wherein the intrinsic viscosity of the modified polyester is 1.0-1.2 dL/g after solid-state polycondensation to increase viscosity;

wherein the spinning process involves the following parameters:

a spinning temperature of 290-310° C.;
a cooling air temperature of 20-30° C.;
a first godet roller speed of 480-600 m/min; a first godet roller temperature of room temperature;
a second godet roller speed of 500-1000 m/min; a second godet roller temperature of 80-100° C.;
a third godet roller speed of 1800-2500 m/min; a third godet roller temperature of 100-150° C.;
a fourth godet roller speed of 2800-3500 m/min; a fourth godet roller temperature of 200-250° C.;
a fifth godet roller speed of 2800-3500 m/min; a fifth godet roller temperature of 200-250° C.;
a sixth godet roller speed of 2600-3400 m/mm; a sixth godet roller temperature of 150-220° C.;
a winding speed of 2550-3340 m/min.

Invention Mechanism:

As the temperature rises, the energy of molecular thermal motion increases gradually, when it reaches Tg, it is sufficient to overcome the internal rotation of the potential barrier, the coordinated motions of internal rotations of dozens of adjacent single bonds are excited, and the segments can start to move to change the conformation of the chain, and the free volume of the high polymer increases.

The diffusion of the coordination agent into polyester fibers can be described by the so-called channel and free-volume models. Above the glass transition temperature of the polyester fiber, the free volume inside the polyester slice is relatively large, containing many "holes" enough to accommodate the entry of the coordination agent, and the coordination agent molecules diffuse through the "hole" inside the slice.

The metal-ligand interaction exhibit high strength while maintaining the dynamic reversibility of the supramolecular bond. In supramolecular polymers, hydrogen bonds, ionic bonds and coordination bonds as the forms of intermolecular interactions, not only form physical cross-linking points, but also realize the process of breaking and reforming under certain conditions. Different from ordinary supramolecular bonds, coordination bonds have the bond energy comparable to ordinary covalent bonds. Therefore, polymers containing a large number of coordination bonds have potential reshaping properties. The coordination supramolecular polymer has excellent shape memory and reshaping properties, that is, under the action of stress, the cross-linked node between the molecular segments of the polymer is destroyed, and when the stress is eliminated, the cross-linked network node will be regenerated. Under the condition of continuous stress, the fiber of the invention has improved creep resistance due to the increase of intermolecular force and physical cross-linking points; under the condition of intermittent stress, due to the dynamic reversibility of the coordination bond, the coordination bond reforms when stress is eliminated, so that the creep resistance is improved.

In the practical application of polyester, due to the linear arrangement of the molecular chains, and the chain segments do not have a relatively strong cross-linking node as support, the mechanical properties are often inevitably affected when subjected to stress. The cross-linking point can be a chemical cross-linking node or a physical cross-linking node, wherein the chemical cross-linking structure forms a stable intramolecular chemical bond, while the physical cross-linking structure includes hydrogen bonds, ionic bonds, and coordination bonds.

The invention coordinates the 2-(4-pyridine) terephthalic acid segment with the metal ion to form a coordination structure, and the metal-ligand coordination interaction enhances the molecular interaction of the macromolecular segment and forms a physical crosslinking point, hindering the movement of the polymer chains. In the metal ion-doped polyester, there are two or more pyridine ligands around one core of the metal ion, and cross-linking points are formed between two or more molecular chains, which increases the elastic modulus of the macromolecule, is beneficial to restrict the movement of polymer chains and reduces the creep degree of the polyester fiber.

The magnitude of the creep is due to the stress relaxation dynamics and the network cross-linked node, which are strongly correlated with the strength and density of the nodes. The common polyester industrial yarn does not contain coordination bonds, only the hydrogen bond cross-linking points formed by the ester group between the polyester macromolecules act as network nodes, however, under the condition of stress, some of hydrogen bonds quickly dissociate, and the macroscopic performance is stress relaxation. Based on the properties that the coordination bond can dissociate and regenerate under stress, the stress relaxation decreases in the polymer containing more coordination bonds. After the metal ion and the pyridine form the coordination bond, the polymer segment is more likely to be frozen, which indicates that the metal-pyridine coordination mainly strengthens the intermolecular force, because the metal-ligand interaction has a strong bond energy, so it is determined the metal-pyridine coordination plays a key role in the enhanced physical points, enabling polyesters to maintain better mechanical properties under stress.

Benefits:

The invention coordinates the 2-(4-pyridine) terephthalic acid segment with the metal ion to form a coordination structure, and the metal-ligand coordination interaction enhances the molecular interaction of the macromolecular segment and forms a physical crosslinking point, hindering the movement of the polymer chains. In the metal ion-doped polyester, there are two or more pyridine ligands around one core of the metal ion, and cross-linking points are formed between two or more molecular chains, which increases the elastic modulus of the macromolecule, is beneficial to restrict the movement of polymer chains and reduces the creep degree of the polyester fiber; the creep test is carried out at a temperature of 25° C., a relative humidity of 65%, a constant tension of 2.00 cN/dtex and a time of 10 min, and the measured elongation of the high-strength creep-resistant polyester industrial yarn is 1.5-1.7%. In addition, the metal-pyridine coordination plays a key role in the enhanced physical points, enabling polyesters to maintain better mechanical properties under stress.

DETAILED DESCRIPTION OF THE EMBODIMENTS

Based on above mentioned method, the following embodiments are carried out for further demonstration in the present invention. It is to be understood that these embodiments are only intended to illustrate the invention and are not intended to limit the scope of the invention. In addition, it should be understood that after reading the contents described in the present invention, those technical personnel in this field can make various changes or modifications to the invention, and these equivalent forms also fall within the scope of the claims attached to the application.

Example 1

A method of preparing the high-strength creep-resistant polyester industrial yarn, including the following steps:
(1) Preparation of the Modified Polyester
(1.1) Esterification concocting terephthalic acid, ethylene glycol, and 2-(4-pyridine) terephthalic acid with a molar ratio of 1:1.2: 0.03 into a slurry, adding the catalyst (antimony trioxide) and the stabilizer (triphenyl phosphate) and mixing uniformly, and the addition amount of the catalyst and the stabilizer is respectively 0.01 wt % and 0.03 wt % of the addition amount of terephthalic acid, then carrying out the esterification under the nitrogen pressure of 0.2 MPa, the temperature of the esterification is 259° C., finally ending the esterification when the water distillation amount reaches 96% of the theoretical value;

(1.2) Polycondensation after the esterification, starting a low vacuum stage of the polycondensation under the negative pressure, smoothly reducing the nitrogen pressure to the absolute pressure of 450 Pa within 40 min, the temperature of the polycondensation is 254° C. and the time is 40 min, and then continue vacuuming to conduct a high vacuum stage of the polycondensation, further reducing the nitrogen pressure to the absolute pressure of 100 Pa, the temperature of the polycondensation is 270° C. and the time is 90 min, and the modified polyester is obtained;

(2) Spinning and Winding the Modified Polyester after Solid-State Polycondensation to Increase Viscosity;

wherein the intrinsic viscosity of the modified polyester is 1 dL/g after solid-state polycondensation to increase viscosity;

wherein the spinning process involves the following parameters:
a spinning temperature of 290° C.;
a cooling air temperature of 20° C.;
a first godet roller speed of 480 m/min; a first godet roller temperature of 25° C.;
a second godet roller speed of 500 m/min; a second godet roller temperature of 80° C.;
a third godet roller speed of 1800 m/min; a third godet roller temperature of 100° C.;
a fourth godet roller speed of 2800 m/min; a fourth godet roller temperature of 200° C.;
a fifth godet roller speed of 2800 m/min; a fifth godet roller temperature of 200° C.;
a sixth godet roller speed of 2600 m/min; a sixth godet roller temperature of 150° C.;
a winding speed of 2550 m/min.

(3) Coordination Treatment to Obtain the High-Strength Creep-Resistant Polyester Industrial Yarn;

soaking the wound fiber in the aqueous solution of the coordination agent for 64 hours at 95° C.; wherein the coordination agent is AgNO$_3$, and the concentration of the aqueous solution of the coordination agent is 0.1 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.03; wherein the 2-(4-pyridine) terephthalic acid segments of different polyester segments are coordinated by Ag$^+$, and the N atom on the pyridine of the 2-(4-pyridine) terephthalic acid segment is involved in the coordination, the coordination structure formed by coordination is

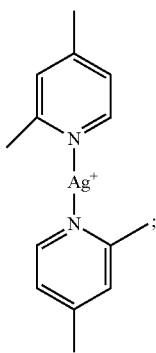

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.7%; wherein the performance indexes of the high-strength creep-resistant polyester industrial yarn are as follows: the breaking strength is 7.6 cN/dtex, the breaking strength CV value is 1.8%, the breaking elongation is 21.5%, and the breaking elongation CV value is 5%.

Example 2

A method of preparing the high-strength creep-resistant polyester industrial yarn, including the following steps:

(1) Preparation of the Modified Polyester (1.1) Esterification concocting terephthalic acid, ethylene glycol, and 2-(4-pyridine) terephthalic acid with a molar ratio of 1:1.5:0.03 into a slurry, adding the catalyst (antimony trioxide) and the stabilizer (triphenyl phosphate) and mixing uniformly, and the addition amount of the catalyst and the stabilizer is respectively 0.01 wt % and 0.04 wt % of the addition amount of terephthalic acid, then carrying out the esterification under the nitrogen pressure of 0.2 MPa, the temperature of the esterification is 260° C., finally ending the esterification when the water distillation amount reaches 96% of the theoretical value;

(1.2) Polycondensation after the esterification, starting a low vacuum stage of the polycondensation under the negative pressure, smoothly reducing the nitrogen pressure to the absolute pressure of 480 Pa within 45 min, the temperature of the polycondensation is 252° C. and the time is 45 min, and then continue vacuuming to conduct a high vacuum stage of the polycondensation, further reducing the nitrogen pressure to the absolute pressure of 30 Pa, the temperature of the polycondensation is 279° C. and the time is 70 min, and the modified polyester is obtained;

(2) Spinning and Winding the Modified Polyester after Solid-State Polycondensation to Increase Viscosity;

wherein the intrinsic viscosity of the modified polyester is 1 dL/g after solid-state polycondensation to increase viscosity;

wherein the spinning process involves the following parameters:
a spinning temperature of 291° C.;
a cooling air temperature of 21° C.;
a first godet roller speed of 500 m/min; a first godet roller temperature of 25° C.;
a second godet roller speed of 600 m/min; a second godet roller temperature of 85° C.;
a third godet roller speed of 2000 m/min; a third godet roller temperature of 110° C.;
a fourth godet roller speed of 2900 m/min; a fourth godet roller temperature of 210° C.;
a fifth godet roller speed of 2900 m/min; a fifth godet roller temperature of 210° C.;
a sixth godet roller speed of 2700 m/min; a sixth godet roller temperature of 160° C.;
a winding speed of 2600 m/min.

(3) Coordination Treatment to Obtain the High-Strength Creep-Resistant Polyester Industrial Yarn;

soaking the wound fiber in the aqueous solution of the coordination agent for 63 hours at 97° C.; wherein the coordination agent is AgNO$_3$, and the concentration of the aqueous solution of the coordination agent is 0.1 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.03; wherein the 2-(4-pyridine) terephthalic acid segments of different polyester segments are coordinated by $Ag^+$, and the N atom on the pyridine of the 2-(4-pyridine) terephthalic acid segment is involved in the coordination, the coordination structure formed by coordination is

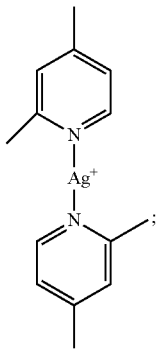

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.7%; wherein the performance indexes of the high-strength creep-resistant polyester industrial yarn are as follows: the breaking strength is 7.5 cN/dtex, the breaking strength CV value is 1.86%, the breaking elongation is 21%, and the breaking elongation CV value is 5.1%.

Example 3

A method of preparing the high-strength creep-resistant polyester industrial yarn, including the following steps:

(1) Preparation of the Modified Polyester (1.1) Esterification concocting terephthalic acid, ethylene glycol, and 2-(4-pyridine) terephthalic acid with a molar ratio of 1:2.0: 0.03 into a slurry, adding the catalyst (antimony trioxide) and the stabilizer (trimethyl phosphate) and mixing uniformly, and the addition amount of the catalyst and the stabilizer is respectively 0.02 wt % and 0.05 wt % of the addition amount of terephthalic acid, then carrying out the esterification under the nitrogen pressure of 0.3 MPa, the temperature of the esterification is 254° C., finally ending the esterification when the water distillation amount reaches 95% of the theoretical value;

(1.2) Polycondensation after the esterification, starting a low vacuum stage of the polycondensation under the negative pressure, smoothly reducing the nitrogen pressure to the absolute pressure of 500 Pa within 50 min, the temperature of the polycondensation is 250° C. and the time is 50 min, and then continue vacuuming to conduct a high vacuum stage of the polycondensation, further reducing the nitrogen pressure to the absolute pressure of 28 Pa, the temperature of the polycondensation is 280° C. and the time is 60 min. and the modified polyester is obtained;

(2) Spinning and Winding the Modified Polyester after Solid-State Polycondensation to Increase Viscosity;

wherein the intrinsic viscosity of the modified polyester is 1 dL/g after solid-state polycondensation to increase viscosity;

wherein the spinning process involves the following parameters:

a spinning temperature of 294° C.;

a cooling air temperature of 23° C.;

a first godet roller speed of 510 m/min; a first godet roller temperature of 26° C.;

a second godet roller speed of 700 m/min; a second godet roller temperature of 88° C.;

a third godet roller speed of 2100 m/min; a third godet roller temperature of 120° C.;

a fourth godet roller speed of 3000 m/min; a fourth godet roller temperature of 220° C.;

a fifth godet roller speed of 3000 m/min; a fifth godet roller temperature of 220° C.;

a sixth godet roller speed of 2900 m/min; a sixth godet roller temperature of 170° C.;

a winding speed of 2700 m/min.

(3) Coordination Treatment to Obtain the High-Strength Creep-Resistant Polyester Industrial Yarn;

soaking the wound fiber in the aqueous solution of the coordination agent for 68 hours at 90° C.; wherein the coordination agent is $FeCl_2$, and the concentration of the aqueous solution of the coordination agent is 0.1 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.03; wherein the 2-(4-pyridine) terephthalic acid segments of different polyester segments are coordinated by $Fe^{2+}$, and the N atom on the pyridine of the 2-(4-pyridine) terephthalic acid segment is involved in the coordination, the coordination structure formed by coordination is

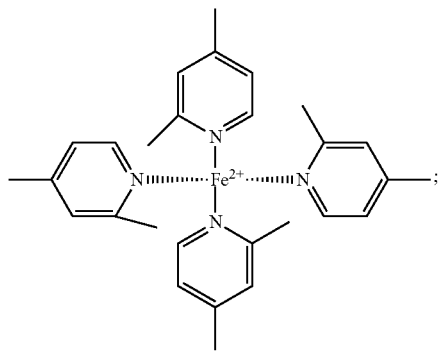

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.6%; wherein the performance indexes of the high-strength creep-resistant polyester industrial yarn are as follows: the breaking strength is 7.7 cN/dtex, the breaking strength CV value is 1.9%, the breaking elongation is 20.6%, and the breaking elongation CV value is 5.2%.

Example 4

A method of preparing the high-strength creep-resistant polyester industrial yarn, including the following steps:
(1) Preparation of the Modified Polyester
(1.1) Esterification
concocting terephthalic acid, ethylene glycol, and 2-(4-pyridine) terephthalic acid with a molar ratio of 1:1.2: 0.04 into a slurry, adding the catalyst (ethylene glycol antimony) and the stabilizer (trimethyl phosphate) and mixing uniformly, and the addition amount of the catalyst and the stabilizer is respectively 0.03 wt % and 0.01 wt % of the addition amount of terephthalic acid, then carrying out the esterification under the nitrogen pressure of 0.1 MPa, the temperature of the esterification is 256° C., finally ending the esterification when the water distillation amount reaches 95% of the theoretical value;
(1.2) Polycondensation
after the esterification, starting a low vacuum stage of the polycondensation under the negative pressure, smoothly reducing the nitrogen pressure to the absolute pressure of 410 Pa within 39 min, the temperature of the polycondensation is 256° C. and the time is 39 min, and then continue vacuuming to conduct a high vacuum stage of the polycondensation, further reducing the nitrogen pressure to the absolute pressure of 26 Pa, the temperature of the polycondensation is 275° C. and the time is 85 min, and the modified polyester is obtained;
(2) Spinning and Winding the Modified Polyester after Solid-State Polycondensation to Increase Viscosity;
wherein the intrinsic viscosity of the modified polyester is 1.1 dL/g after solid-state polycondensation to increase viscosity;
wherein the spinning process involves the following parameters:
a spinning temperature of 297° C.;
a cooling air temperature of 25° C.;
a first godet roller speed of 530 m/min; a first godet roller temperature of 26° C.;
a second godet roller speed of 800 m/min; a second godet roller temperature of 90° C.;
a third godet roller speed of 2200 m/min; a third godet roller temperature of 130° C.;
a fourth godet roller speed of 3100 m/min; a fourth godet roller temperature of 230° C.;
a fifth godet roller speed of 3100 m/min; a fifth godet roller temperature of 230° C.;
a sixth godet roller speed of 3100 m/min; a sixth godet roller temperature of 180° C.;
a winding speed of 2800 m/min.
(3) Coordination Treatment to Obtain the High-Strength Creep-Resistant Polyester Industrial Yarn;
soaking the wound fiber in the aqueous solution of the coordination agent for 65 hours at 92° C.; wherein the coordination agent is $CuCl_2$, and the concentration of the aqueous solution of the coordination agent is 0.2 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.4; wherein the 2-(4-pyridine) terephthalic acid segments of different polyester segments are coordinated by $Cu^{2+}$, and the N atom on the pyridine of the 2-(4-pyridine) terephthalic acid segment is involved in the coordination, the coordination structure formed by coordination is

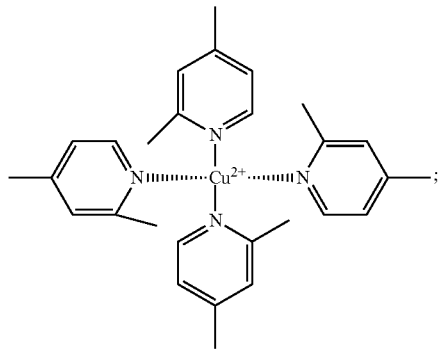

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.6%; wherein the performance indexes of the high-strength creep-resistant polyester industrial yarn are as follows: the breaking strength is 8.2 cN/dtex, the breaking strength CV value is 1.9%, the breaking elongation is 19.7%, and the breaking elongation CV value is 5.3%.

Example 5

A method of preparing the high-strength creep-resistant polyester industrial yarn, including the following steps:
(1) Preparation of the Modified Polyester
(1.1) Esterification
concocting terephthalic acid, ethylene glycol, and 2-(4-pyridine) terephthalic acid with a molar ratio of 1:1.5: 0.04 into a slurry, adding the catalyst (ethylene glycol antimony) and the stabilizer (trimethyl phosphate) and mixing uniformly, and the addition amount of the catalyst and the stabilizer is respectively 0.03 wt % and 0.03 wt % of the addition amount of terephthalic acid, then carrying out the esterification under the nitrogen pressure of 0.2 MPa, the temperature of the esterification is 258° C., finally ending the esterification when the water distillation amount reaches 97% of the theoretical value;
(1.2) Polycondensation
after the esterification, starting a low vacuum stage of the polycondensation under the negative pressure, smoothly reducing the nitrogen pressure to the absolute pressure of 300 Pa within 30 min, the temperature of the polycondensation is 260° C. and the time is 30 min, and then continue vacuuming to conduct a high vacuum stage of the polycondensation, further reducing the nitrogen pressure to the absolute pressure of 25 Pa, the temperature of the polycondensation is 277° C. and the time is 80 min, and the modified polyester is obtained;
(2) Spinning and Winding the Modified Polyester after Solid-State Polycondensation to Increase Viscosity;
wherein the intrinsic viscosity of the modified polyester is 1.1 dL/g after solid-state polycondensation to increase viscosity;

wherein the spinning process involves the following parameters:

a spinning temperature of 299° C.;

a cooling air temperature of 27° C.;

a first godet roller speed of 560 m/min; a first godet roller temperature of 27° C.;

a second godet roller speed of 850 m/min; a second godet roller temperature of 93° C.;

a third godet roller speed of 2300 m/min; a third godet roller temperature of 140° C.;

a fourth godet roller speed of 3200 m/min; a fourth godet roller temperature of 240° C.;

a fifth godet roller speed of 3200 m/min; a fifth godet roller temperature of 240° C.;

a sixth godet roller speed of 3200 m/min; a sixth godet roller temperature of 190° C.;

a winding speed of 3000 m/min.

(3) Coordination Treatment to Obtain the High-Strength Creep-Resistant Polyester Industrial Yarn;

soaking the wound fiber in the aqueous solution of the coordination agent for 72 hours at 80° C.; wherein the coordination agent is $CuCl_2$, and the concentration of the aqueous solution of the coordination agent is 0.2 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.4; wherein the 2-(4-pyridine) terephthalic acid segments of different polyester segments are coordinated by $Cu^{2+}$, and the N atom on the pyridine of the 2-(4-pyridine) terephthalic acid segment is involved in the coordination, the coordination structure formed by coordination is

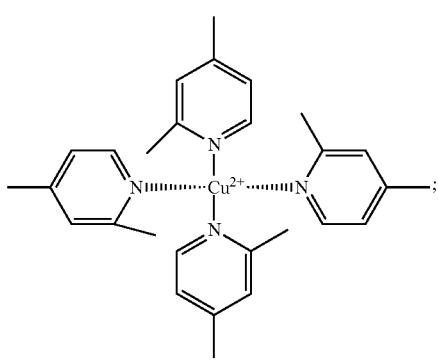

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.5%; wherein the performance indexes of the high-strength creep-resistant polyester industrial yarn are as follows: the breaking strength is 8 cN/dtex, the breaking strength CV value is 1.96%, the breaking elongation is 19.4%, and the breaking elongation CV value is 5.4%.

Example 6

A method of preparing the high-strength creep-resistant polyester industrial yarn, including the following steps:

(1) Preparation of the Modified Polyester (1.1) Esterification concocting terephthalic acid, ethylene glycol, and 2-(4-pyridine) terephthalic acid with a molar ratio of 1:2.0:0.04 into a slurry, adding the catalyst (antimony acetate) and the stabilizer (trimethyl phosphite) and mixing uniformly, and the addition amount of the catalyst and the stabilizer is respectively 0.04 wt % and 0.01 wt % of the addition amount of terephthalic acid, then carrying out the esterification under the nitrogen pressure of 0.2 MPa, the temperature of the esterification is 250° C., finally ending the esterification when the water distillation amount reaches 90% of the theoretical value;

(1.2) Polycondensation after the esterification, starting a low vacuum stage of the polycondensation under the negative pressure, smoothly reducing the nitrogen pressure to the absolute pressure of 350 Pa within 35 min, the temperature of the polycondensation is 259° C. and the time is 35 min, and then continue vacuuming to conduct a high vacuum stage of the polycondensation, further reducing the nitrogen pressure to the absolute pressure of 20 Pa, the temperature of the polycondensation is 281° C. and the time is 55 min, and the modified polyester is obtained;

(2) Spinning and Winding the Modified Polyester after Solid-State Polycondensation to Increase Viscosity;

wherein the intrinsic viscosity of the modified polyester is 1.2 dL/g after solid-state polycondensation to increase viscosity;

wherein the spinning process involves the following parameters:

a spinning temperature of 305° C.;

a cooling air temperature of 28° C.;

a first godet roller speed of 580 m/min; a first godet roller temperature of 27° C.;

a second godet roller speed of 900 m/min; a second godet roller temperature of 95° C.;

a third godet roller speed of 2400 m/min; a third godet roller temperature of 145° C.;

a fourth godet roller speed of 3400 m/min; a fourth godet roller temperature of 245° C.;

a fifth godet roller speed of 3400 m/min; a fifth godet roller temperature of 245° C.;

a sixth godet roller speed of 3300 m/min; a sixth godet roller temperature of 210° C.;

a winding speed of 3150 m/min.

(3) Coordination Treatment to Obtain the High-Strength Creep-Resistant Polyester Industrial Yarn;

soaking the wound fiber in the aqueous solution of the coordination agent for 70 hours at 85° C.; wherein the coordination agent is $NiCl_2$, and the concentration of the aqueous solution of the coordination agent is 0.2 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.4; wherein the 2-(4-pyridine) terephthalic acid segments of different polyester segments are coordinated by $Ni^{2+}$, and the N atom on the pyridine of the 2-(4-pyridine) terephthalic acid segment is involved in the coordination, the coordination structure formed by coordination is

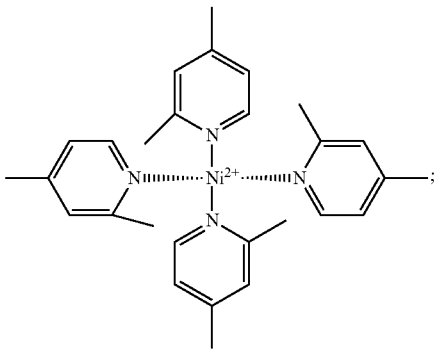

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.5%; wherein the performance indexes of the high-strength creep-resistant polyester industrial yarn are as follows: the breaking strength is 7.9 cN/dtex, the breaking strength CV value is 1.94%, the breaking elongation is 19.2%, and the breaking elongation CV value is 5.5%.

Example 7

A method of preparing the high-strength creep-resistant polyester industrial yarn, including the following steps:

(1) Preparation of the Modified Polyester (1.1) Esterification concocting terephthalic acid, ethylene glycol, and 2-(4-pyridine) terephthalic acid with a molar ratio of 1:1.2:0.05 into a slurry, adding the catalyst (antimony acetate) and the stabilizer (trimethyl phosphite) and mixing uniformly, and the addition amount of the catalyst and the stabilizer is respectively 0.05 wt % and 0.02 wt % of the addition amount of terephthalic acid, then carrying out the esterification under the nitrogen pressure of 0.3 MPa, the temperature of the esterification is 252° C., finally ending the esterification when the water distillation amount reaches 95% of the theoretical value;

(1.2) Polycondensation after the esterification, starting a low vacuum stage of the polycondensation under the negative pressure, smoothly reducing the nitrogen pressure to the absolute pressure of 380 Pa within 37 min, the temperature of the polycondensation is 258° C. and the time is 37 min, and then continue vacuuming to conduct a high vacuum stage of the polycondensation, further reducing the nitrogen pressure to the absolute pressure of 15 Pa, the temperature of the polycondensation is 282° C. and the time is 50 min, and the modified polyester is obtained;

(2) Spinning and Winding the Modified Polyester after Solid-State Polycondensation to Increase Viscosity;

wherein the intrinsic viscosity of the modified polyester is 1.2 dL/g after solid-state polycondensation to increase viscosity;

wherein the spinning process involves the following parameters:

a spinning temperature of 310° C.;

a cooling air temperature of 30° C.;

a first godet roller speed of 600 m/min; a first godet roller temperature of 27° C.;

a second godet roller speed of 1000 m/min; a second godet roller temperature of 100° C.;

a third godet roller speed of 2500 m/min; a third godet roller temperature of 150° C.;

a fourth godet roller speed of 3500 m/min; a fourth godet roller temperature of 250° C.;

a fifth godet roller speed of 3500 m/min; a fifth godet roller temperature of 250° C.;

a sixth godet roller speed of 3400 m/min; a sixth godet roller temperature of 220° C.;

a winding speed of 3340 m/min.

(3) Coordination Treatment to Obtain the High-Strength Creep-Resistant Polyester Industrial Yarn;

soaking the wound fiber in the aqueous solution of the coordination agent for 60 hours at 100° C.; wherein the coordination agent is $NiCl_2$, and the concentration of the aqueous solution of the coordination agent is 0.2 mol/L.

The polyester segments of the prepared high-strength creep-resistant polyester industrial yarn includes the terephthalic acid segment, the ethylene glycol segment and the 2-(4-pyridine) terephthalic acid segment, the molar ratio of the terephthalic acid segment to the 2-(4-pyridine) terephthalic acid segment is 1:0.5; wherein the 2-(4-pyridine) terephthalic acid segments of different polyester segments are coordinated by $Ni^{2+}$, and the N atom on the pyridine of the 2-(4-pyridine) terephthalic acid segment is involved in the coordination, the coordination structure formed by coordination is

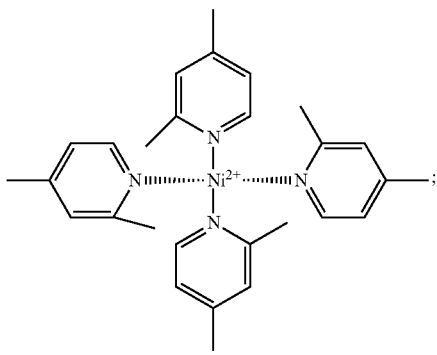

wherein the creep test is carried out at a temperature of 25° C., a relative humidity of 65%, a constant tension of 2.00 cN/dtex and a time of 10 min, and the measured elongation of the high-strength creep-resistant polyester industrial yarn is 1.5%; wherein the performance indexes of the high-strength creep-resistant polyester industrial yarn are as follows: the breaking strength is 8.3 cN/dtex, the breaking strength CV value is 2%, the breaking elongation is 18.5%, and the breaking elongation CV value is 5.5%.

What is claimed is:

1. A high-strength creep-resistant polyester industrial yarn, wherein polyester segments of the high-strength creep-resistant polyester industrial yarn comprise a terephthalic acid segment, an ethylene glycol segment and a 2-(4-pyridine) terephthalic acid segment, and 2-(4-pyridine) terephthalic acid segments of different polyester segments are coordinated by metal ions;

wherein a molar ratio of the terephthalic acid segment to the 2-(4-pyridine) terephthalic acid segment is 1: (0.03-0.05);

wherein the N atom on the pyridine of the 2-(4-pyridine) terephthalic acid segment is involved in the coordination;

wherein the metal ion is $Ag^+$, $Fe^{2+}$, $Cu^{2+}$ or $Ni^{2+}$; and

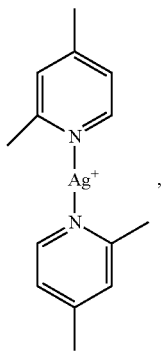

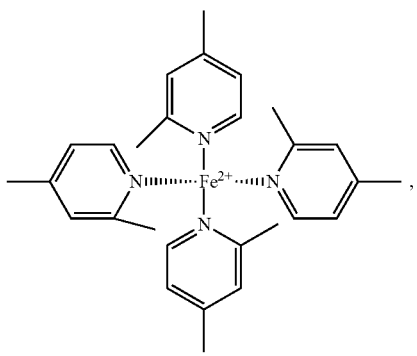

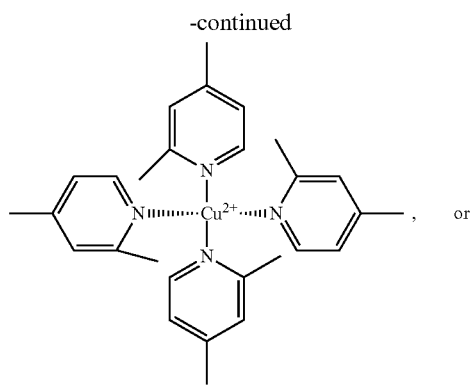

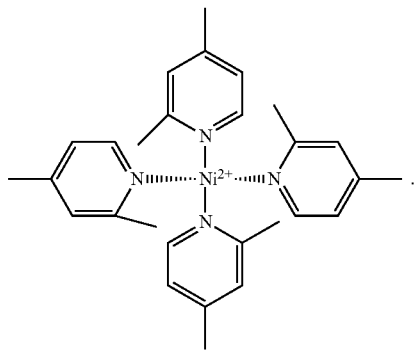

wherein the coordination comprises a coordination structure comprising.

2. The high-strength creep-resistant polyester industrial yarn of claim 1, wherein a creep test is carried out at a temperature of 25° C., a relative humidity of 65%, a constant tension of 2.00 cN/dtex and a time of 10 min, and a measured elongation of the high-strength creep-resistant polyester industrial yarn is 1.5-1.7%.

3. The high-strength creep-resistant polyester industrial yarn of claim 1, wherein performance indexes of the high-strength creep-resistant polyester industrial yarn are as follows: a breaking strength ≥7.5 cN/dtex, a breaking strength CV value ≤2.0%, a breaking elongation of 20.0=1.5%, and a breaking elongation CV value ≤5.5%.

4. The high-strength creep-resistant polyester industrial yarn of claim 1, wherein the coordination comprises a coordination structure comprising

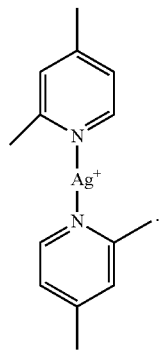

5. The high-strength creep-resistant polyester industrial yarn of claim 1, wherein the coordination comprises a coordination structure comprising

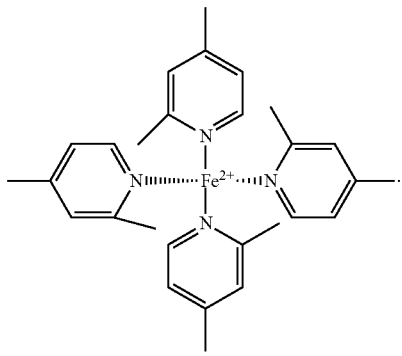

6. The high-strength creep-resistant polyester industrial yarn of claim 1, wherein the coordination comprises a coordination structure comprising

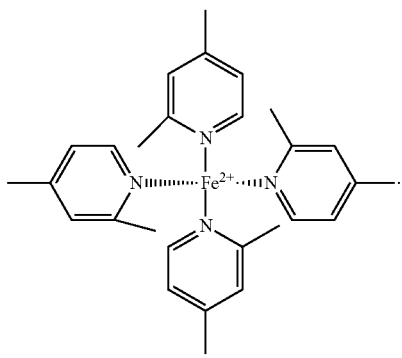

7. The high-strength creep-resistant polyester industrial yarn of claim 1, wherein the coordination comprises a coordination structure comprising

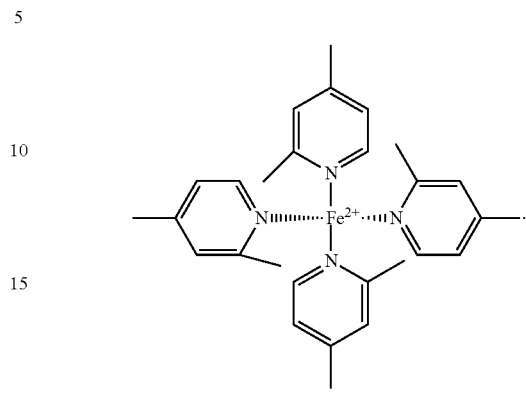

8. A high-strength creep-resistant polyester industrial yarn, wherein polyester segments of the high-strength creep-resistant polyester industrial yarn comprise a terephthalic acid segment, an ethylene glycol segment and a 2-(4-pyridine) terephthalic acid segment, and 2-(4-pyridine) terephthalic acid segments of different polyester segments are coordinated by metal ions;

wherein a molar ratio of the terephthalic acid segment to the 2-(4-pyridine) terephthalic acid segment is 1:(0.03-0.05);

wherein the N atom on the pyridine of the 2-(4-pyridine) terephthalic acid segment is involved in the coordination; and wherein the metal ion is $Fe^{2+}$ or $Ni^2$.

* * * * *